Patented Sept. 13, 1949

2,481,673

UNITED STATES PATENT OFFICE 2,481,673

2-AMINO- AND 2-ALKYLTHIO-4-(2-FURYL)-THIAZOLES

Edward B. Knott, Frances M. Hamer, and Russell J. Rathbone, Harrow, Wealdstone, England, assignors to Eastman Kodak Company, Rochester, N. Y., a corporation of New Jersey No Drawing. Application February 7, 1946, Serial No. 646,207. In Great Britain March 1, 1945

8 Claims. (Cl. 260—302)

This invention relates to 2-amino- and 2-alkylthio-4-(2-furyl)thiazoles.

The 2-amino- and 2-alkylthio-4-(2-furyl)-thiazoles of our invention can be represented by the following general formula:

I.

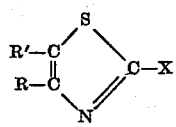

wherein R represents a 2-furyl group, R' represents a hydrogen atom, an alkyl group, an aralkyl group or an aryl group, X represents an amino group or an alkylthio group, e. g. methylthio, ethylthio, n-propylthio, n-butylthio, isobutylthio, etc., or an aralkylthio group, e. g. benzylthio or β-phenylethylthio.

In accordance with our invention, we prepare 2-amino- or 2-alkylthio-4-(2-furyl)thiazoles by condensing a 2-(α-halogenoacyl)furan of the following general formula:

II.
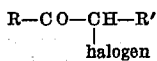

wherein R represents a 2-furyl group, substituted or not substituted, and R' represents a hydrogen atom or an alkyl group, e. g. methyl, ethyl, isopropyl, n-butyl, etc. or an aryl group, e. g. phenyl, p-chlorophenyl, etc., with a thioamide of the following general formula:

III.
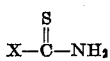

wherein X has the values given above. Typical thioamides which we employ in practicing our invention are: thiourea, and S-alkyl- or S-aralkyldithiocarbamates, e. g. methyl dithiocarbamate, ethyl dithiocarbamate, n-propyl dithiocarbamate, isobutyl dithiocarbamate, benzyl dithiocarbamate, etc.

The condensation proceeds smoothly in all cases upon heating the 2-(α-halogenoacyl)furan and the thioamide together, advantageously in a solvent, e. g. methyl alcohol, ethyl alcohol, n-propyl alcohol, isopropyl alcohol, isobutyl alcohol, n-butyl alcohol, etc. The condensations take place rapidly at elevated temperatures and are accelerated by the addition of alkalies, e. g. alkali metal carbonates, e. g. sodium or potassium carbonate. Alkali metal bicarbonates, e. g. sodium or potassium bicarbonate, also accelerate the condensations.

The following examples will serve to illustrate further the manner of practicing our invention:

*Example 1.—2-amino-4-(2-furyl)thiazole*

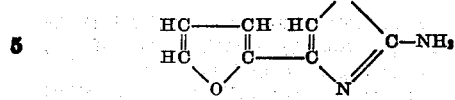

Thiourea (3.8 g.), 2-chloroacetylfuran (7.22 g.) and ethyl alcohol (50 cc.) were heated carefully until a solution formed. Anhydrous sodium carbonate (2.6 g.) was then added to the solution which was then refluxed for 5 minutes. Upon adding water the 2-amino-4-(2-furyl)thiazole separated as glistening crystals. The thiazole derivative was filtered off and recrystallized from a mixture of benzene and petroleum ether. It was obtained as glistening buff needles, melting at 124.5° C.

*Example 2.—4-(2-furyl)-2-methylthiothiazole*

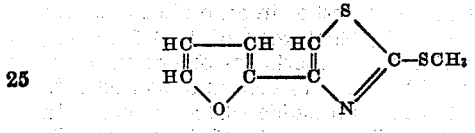

Methyldithiocarbamate (2.6 g.), 2-bromoacetylfuran (4.5 g.) and ethyl alcohol (10 cc.) were warmed gently. Reaction occurred and the hydrobromide of 4-(2-furyl)-2-methylthiothiazole precipitated. The mixture was chilled and 50 cc. of diethyl ether were added. The hydrobromide was then collected on a filter. It was recrystallized from a mixture of ethyl alcohol and ether and obtained as glistening shiny plates, melting at 206 to 210° C. The hydrobromide was dissolved in aqueous ethyl alcohol. The solution was diluted with aqueous sodium carbonate solution, and the oil which precipitated was taken up in diethyl ether. The ether extract was dried and distilled. 4-(2-furyl)-2-methylthiothiazole distilled at 177° C. at 18 mm. of Hg pressure. It was obtained as a thick oil, having a mushroom-like odor.

In a manner similar to that illustrated in Example 2, 2-butylthio-4-(2-furyl)thiazole, 2-benzylthio-4-(2-furyl)thiazole and 2-ethylthio-4-(2-furyl)thiazole can be prepared using butyldithiocarbamate, benzyldithiocarbamate and ethyldithiocarbamate respectively.

The 2-(α-halogenoacyl)furans can be prepared by a modification of the procedure described by Burger and Harnest, J. Am. Chem. Soc. 65, 2382 (1943). These authors describe 2-chloroacetylfuran as an oil, but I have obtained it in crystalline form as shown in the following example.

*Example 3.—2-chloroacetylfuran*

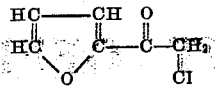

Furoyl chloride was converted to 2-diazoacetylfuran by treatment with ethereal diazomethane. Dry hydrogen chloride was then passed into the ethereal solution of 2-diazoacetylfuran. On distilling the ether the 2-chloroacetylfuran remained as an oil. This was distilled and found to boil at 125° C. at 18 mm. of Hg pressure. Recrystallized from a mixture of benzene and petroleum ether, it was obtained as colorless shining plates, melting at 30.5° C.

Using dry hydrogen bromide instead of hydrogen chloride, 2-bromoacetylfuran was obtained, boiling at 126° C. at 18 mm. of Hg pressure. Recrystallized from a mixture of benzene and petroleum ether, it melted at 34° C. (colorless plates).

The present invention also includes the formation of quaternary salts by heating any of the thiazole derivatives represented by Formula I with an alkyl salt or an aralkyl salt, e. g. an alkyl halide, e. g. n-butyl bromide, ethyl iodide, n-propyl iodide, isobutyl bromide, n-butyl chloride, benzyl bromide, etc., an alkyl-p-toluenesulfonate, e. g. methyl p-toluenesulfonate, ethyl p-toluenesulfonate, etc. a dialkyl sulfate, e. g. dimethyl sulfate, diethyl sulfate, etc.

The following examples will serve to illustrate further the manner of obtaining these quaternary salts:

*Example 4.—4-(2-furyl)-2-methylthiothiazole methiodide*

4-(2-furyl)-2-methylthiothiazole (3.62 g.; 1 mol.) and methyl-p-toluenesulfonate (3.92 g.; 1 mol.) were heated together in an oil bath at 140° C. for 1 hour. The thick melt of 4-(2-furyl)-2-methylthiothiazole metho-p-toluenesulfonate was diluted with water (5 cc.) and poured into a solution of potassium iodide (6.6 g.; 2 mols.) in water (10 cc.). The crystals of 4-(2-furyl)-2-methylthiothiazole methiodide which precipitated were collected and washed with a little ethyl alcohol.

*Example 5.—4-(2-furyl)-2-methylthiothiazole etho-p-toluenesulfonate*

4-(2-furyl)-2-methylthiothiazole (3.15 g.; 1 mol.) and ethyl-p-toluenesulfonate (3.19 g.; 1 mol.) were heated together in an oil bath at 120–140° C. for 6 hours. The resulting 4-(2-furyl)-2-methylthiothiazole etho-p-toluenesulfonate was washed with absolute diethyl ether. It was in the form of a light brown gum and was water soluble.

As shown in Example 4, the anion of the quaternary salt obtained in the original heating can be changed and a less soluble quaternary salt produced by treating a solution of the more soluble quaternary salt (in an alcohol or water) with an aqueous solution of a water-soluble metal salt. Thus, using sodium or potassium iodide, bromide, perchlorate or rhodanate, the quaternary iodides, bromides, perchlorates or rhodanates can be prepared from the quaternary chlorides, p-toluenesulfonates or alkylsulfates. The new quaternary salts of our invention can be represented by the following general formula:

IV.

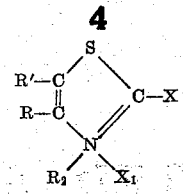

wherein R, R' and X have the values given above, $R_2$ represents an alkyl or aralkyl group and $X_1$ represents an anion.

The quaternary salts of our invention are, in turn, useful for the preparation of methine dyes of the cyanine and merocyanine type. Our new quaternary salts of the above Formula IV wherein X represents an alkylthio or aralkylthio group can be condensed with ketomethylene heterocyclic compounds containing in the ring the following group of atoms:

V.

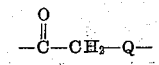

wherein Q represents an oxygen atom, a sulfur atom, a carbonyl group or a —$NR_3$— group wherein $R_3$ represents a hydrogen atom, an alkyl group, an aralkyl group or an aryl group, to give merocyanine dyes of the following general formula:

VI.

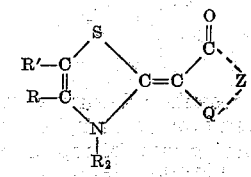

wherein R, R', $R_2$ and Z have the values given above, and Z represents the non-metallic atoms necessary to complete a heterocyclic nucleus, e. g. a rhodanine nucleus, a 2-thio-2,4(3,5)-oxazoledione nucleus, a 2-thiohydantoin nucleus, a 2-diarylamino-4-ketothiazoline nucleus, a 2-(N-alkyl-N-arylamino)-4-ketothiazoline nucleus, a thiobarbituric acid nucleus, etc.

The condensations are advantageously effected in the presence of an acid-binding agent (basic condensing agent), e. g. a tertiary amine, such as a trialkylamine (triethylamine, tripropylamine, tributylamine, etc.), or an alkali metal carbonate (sodium carbonate, potassium carbonate, etc.). It is convenient to effect the condensations in a solvent, e. g. an alcohol, such as ethyl alcohol, n-propyl alcohol or isopropyl alcohol.

The following examples will serve to illustrate further the manner of obtaining our new dyes.

*Example 6.—[5-(3-ethylrhodanine)]-[2-{4-(2-furyl)-3-methylthiazole}]-merocyanine*

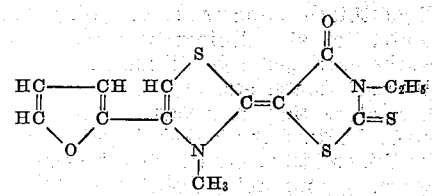

4-(2-furyl)-2-methylthiothiazole methiodide (1.7 g.; 1 mol.), 3-ethylrhodanine (0.81 g.; 1 mol.), triethylamine (1.38 cc.; 2 mols.) and ethyl alcohol (20 cc.) were boiled together, while stirring, for 2 minutes. The mixture was allowed to cool and the above-formulated dye which had separated out was filtered off. The dye was washed with water and then with ethyl alcohol and finally recrystallized from methyl alcohol (50 cc.). The yellow crystals of dye melted at 218° C. with decomposition. A methyl alcoholic solution of the dye had its absorption maximum at 424 mμ. The dye sensitized a gelatino-silver-chloride emulsion with a maximum at 470–480 mμ.

*Example 7.—[5-(2 - diphenylamino-4-ketothiazoline) ]-[2-{4-(2-furyl)-3 - ethylthiazole}]-merocyanine*

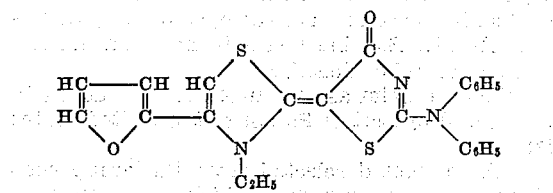

4-(2-furyl)-2-methylthiothiazole etho-p-toluenesulfonate (2.97 g.; 1 mol.), 2-diphenylamino-4-ketothiazoline (2.01 g.; 1 mol.), triethlyamine (1.1 cc.; 2 mols.) and ethyl alcohol (15 cc.) were boiled while stirring, for 3 minutes. The mixture was allowed to cool and the above-formulated dye separated out. It was filtered off and washed with water. The crude dye was boiled out with ethyl alcohol (30 cc.) and the residue was recrystallized from methyl alcohol (130 cc.). The pale yellow dye had a melting point at 281° C. (decomposition). The absorption maximum of its methyl alcoholic solution was at 400 mμ. The dye sensitized a gelatino-silver-chloride emulsion with maximum sensitivity at 420 mμ, the sensitization extending to 470 mμ.

In a manner similar to that illustrated in Examples 6 and 7, other merocyanine dyes of Formula VI can be prepared, e. g. from the following components:

| | 2-alkylthio-4-(2-furyl)-thiazole alkyl quaternary salt | ketomethylene heterocyclic compound |
|---|---|---|
| 1. | 4-(2-furyl)-2-methylthiothiazole etho-p-toluenesulfonate. | 3-phenylrhodanine. |
| 2. | Do | 3-ethyl-2,4(3,5)-oxazoledione. |
| 3. | Do | 1,3 - diphenyl - 2 - thiohydantoin. |
| 4. | Do | 1-ethyl-3 - phenyl - 2 - thiohydantoin. |
| 5. | 4-(2-furyl)-2-methylthiothiazole methiodide. | 3- (β - hydroxyethyl) - rhodanine. |
| 6. | Do | 2-thiohydantoin. |
| 7. | Do | rhodanine. |
| 8. | Do | thiobarbituric acid. |
| 9. | Do | 2-(N-ethyl-N-phenyl)-amino-4-keto-thiazoline. |

Our new quaternary salts represented by Formula IV wherein X represents an alkylthio or aralkylthio group can also be condensed, we have found, with cyclammonium quaternary salts containing a reactive methyl group to give monomethine cyanine dyes.

The condensations are advantageously effected in the presence of an acid-binding agent (basic condensing agent), e. g. a tertiary amine, such as a trialkylamine (triethylamine, tripropylamine, tributylamine, etc.), or an alkali metal carbonate (sodium carbonate, potassium carbonate, etc.). It is convenient to effect the condensations in a solvent, e. g. an alcohol, such as ethyl alcohol, n-propyl alcohol or isopropyl alcohol. Typical of the cyclammonium quaternary salts containing reactive methyl groups are: 2-methylbenzothiazole ethiodide, 2- methylbenzoselenazole ethiodide, 2 - methylbenzoxazole ethiodide, 2-methyl-β-naphthothiazole metho-p-toluenesulfonate, 2 - methyl - α - naphthothiazole etho-p-toluenesulfonate, quinaldine ethiodide, lepidine ethiodide, 4-(2-furyl)-2-methylthiazole methiodide, etc.

4-(2-furyl)-2-methylthiazole methiodide can be prepared as follows:

*Example 8*

4-(2-furyl)-2-methylthiazole (3.62 g.; 1 mol.) and methyl-p-toluenesulfonate (3.92 g.; 1 mol.) were heated together in an oil bath at 140° C. for 1 hour. The thick melt of 4-(2-furyl)-2-methylthiazole metho-p-toluenesulfonate was diluted with water (5 cc.) and poured into a solution of potassium iodide (6.6 grams; 2 mols.) in water (10 cc.). The crystals of 4-(2-furyl)-2-methylthiazole methiodide were collected and washed with a little alcohol.

The 4-(2-furyl)-2-methylthiazole employed above was prepared as follows:

Thioacetamide (7.5 g.), 2-bromacetylfuran (18.9 g.) and ethyl alcohol (20 cc.) were warmed gently to give a clear solution. The liquor suddenly boiled and solidified on cooling. Diethyl ether (50 cc.) was added and the hydrobromide of 4-(2-furyl)2-methylthiazole was collected on a filter. Recrystallized from a mixture of methanol and diethyl ether, the hydrobromide formed glassy needles, melting at 194–196° C. The hydrobromide was dissolved in water and the 4-(2-furyl)-2-methylthiazole liberated by adding aqueous sodium carbonate. The thiazole base was taken up in diethyl ether, the ether solution dried over anhydrous sodium sulfate and distilled. The 4-(2-furyl)-2-methylthiazole distilled at 128° C. at 15 mm. of mercury pressure. It was an oil with a strong thiazole odor.

We have also found that alkyl and aralkyl quaternary salts of 4-(2-furyl)-2-methylthiazole can be condensed with diarylformamidines, e. g. diphenylformamidine, to give 2-(β-anilinovinyl)-4-(2-furyl) thiazole quaternary salts. Such β-anilinovinyl derivatives can also be formed, we have found, by condensing the alkyl and aralkyl quaternary salts of 4-(2-furyl)-2-methylthiazole with an alkyl isoformanilide, e. g. ethyl isoformanilide, or with an alkyl isothioformanilide, e. g. ethyl isothioformanilide, or with a mixture of an alkyl orthoformate, e. g. triethyl orthoformate and a primary aromatic amine or a secondary aromatic amine, e. g. aniline or methylaniline.

The following examples will serve to illustrate further the preparation of the β-anilinovinyl derivatives.

*Example 9.—2-(β-anilinovinyl)-4-(2-furyl) - thiazole ethiodide*

4-(2-furyl)-2-methylthiazole etho-p-toluenesulfonate (7.3 g.; 1 mol.) and ethyl isoformanilide (3.5 g.; 1.1 mol.) were heated together in an oil bath at 130° C. for 30 minutes. The resulting 2-(β-anilinovinyl) - 4-(2-furyl)thiazole etho-p-toluenesulfonate was disolved in hot ethyl alcohol (15 cc.) and poured into a hot solution of potassium iodide (13 g.; 4 mols.) in water (15 cc.). The dark red 2-(β-anilinovinyl)-4-(2-furyl) thiazole ethiodide was filtered off and washed with water.

*Example 10.—2-(β-acetanilidovinyl)-4-(2-furyl)thiazole ethiodide*

2-β-anilinovinyl-4-(2-furyl)thiazole ethiodide (5.6 g.) was boiled with acetic anhydride for 15 minutes. After cooling, diethyl ether was added. The precipitated β-acetanilidovinyl derivative was filtered off and washed with diethyl ether.

The dull yellow solid had a melting point of 160° C. with decomposition.

In Example 10, it is shown that the β-anilinovinyl derivatives can be acylated with carboxylic anhydrides to give β-acylanilinovinyl compounds. Propionic, butyric or benzoic anhydrides can be used for example to replace the acetic anhydride.

The β-anilinovinyl or β-acetanilidovinyl derivatives can be condensed with cyclammonium quaternary salts containing a reactive methyl group to give carbocyanine dyes. For example, condensation can be effected with 2-methylbenzothiazole ethiodide, 4-(2-furyl)-2-methylthiazole metho-p-toluenesulfonate, 2-methylbenzoxazole ethiodide, quinaldine ethiodide, lepidine ethiodide, etc.

The β-anilinovinyl or β-acetanilidovinyl derivatives can also be condensed with heterocyclic compounds containing a ketomethylene group to give merocarbocyanine dyes. For example, condensation can be effected with rhodanine, 3-ethylrhodanine, 3-phenylrhodanine, 3-ethyl-2,4(3,5)-oxazoledione, 2-thiohydantoin, 1,3-diphenylthiohydantoin, etc.

The dyes of our invention sensitize photographic silver halide emulsions when incorporated therein.

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proven satisfactory as a solvent for our new dyes. If desired acetone may also be employed where the solubility of the dyes in methanol is lower than desired.

Sensitization by means of our new dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

What we claim as our invention and desire to be secured by Letters Patent of the United States is:

1. A compound selected from the group consisting of those compounds which are represented by the following general formulas:

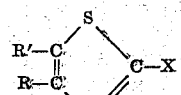

and

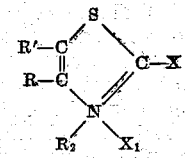

wherein R represents a 2-furyl group, R' represents a member selected from the group consisting of a hydrogen atom, an alkyl group, an aralkyl group and an aryl group, X represents a member selected from the group consisting of an amino group, an alkylthio group and an aralkylthio group, $X_1$ represents an anion and $R_2$ represents a member selected grom the group consisting of an alkyl and an aralkyl group.

2. The compounds which are represented by the following general formula:

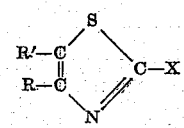

wherein R represents a 2-furyl group, R' represents a member selected from the group consisting of a hydrogen atom, an alkyl group, an aralkyl group, and an aryl group, and X represents a member selected from the group consisting of an amino group, an alkylthio group and an aralkylthio group.

3. A compound represented by the following formula:

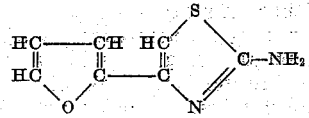

4. The compounds represented by the following general formula:

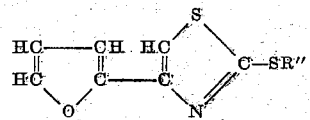

wherein R'' represents an alkyl group.

5. The compound represented by the following formula:

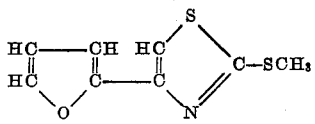

6. The quaternary salts which are represented by the following general formula:

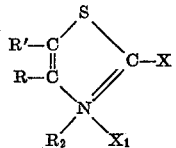

wherein R represents a 2-furyl group, R' represents a member selected from the group consisting of a hydrogen atom, an alkyl group, an aralkyl group and an aryl group, X represents a member selected from the group consisting of an amino group, an alkylthio group and an aralkylthio group, $R_2$ represents a member selected from the group consisting of an alkyl group and an aralkyl group, and $X_1$ represents an anion.

7. The quaternary salt represented by the following formula:

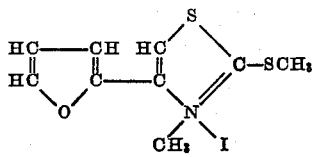

8. The quaternary salt represented by the following formula:

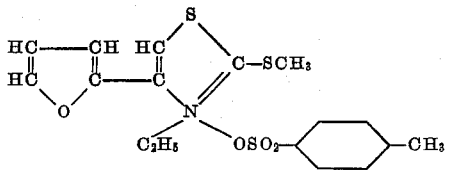

EDWARD B. KNOTT.
FRANCES M. HAMER.
RUSSELL J. RATHBONE.

REFERENCES CITED

The following references are of record in the file of this patent:

UNITED STATES PATENTS

| Number | Name | Date |
|---|---|---|
| 2,213,986 | Kendall | Sept. 10, 1940 |
| 2,302,112 | Middleton | Dec. 8, 1942 |
| 2,423,709 | Knott | July 8, 1947 |

OTHER REFERENCES

Richter's "Organic Chemistry," vol. 3, pp. 12–38.